(12) United States Patent
Bengston

(10) Patent No.: US 11,550,928 B2
(45) Date of Patent: *Jan. 10, 2023

(54) DISTRIBUTED LEDGER-BASED DIGITAL CONTENT TRACING

(71) Applicant: Combined Conditional Access Development and Support, LLC, Philadelphia, PA (US)

(72) Inventor: Eileen Bengston, West Chester, PA (US)

(73) Assignee: Combined Conditional Access Development and Support, LLC, Philadelphia, PA (US)

(*) Notice: Subject to any disclaimer, the term of this patent is extended or adjusted under 35 U.S.C. 154(b) by 423 days.

This patent is subject to a terminal disclaimer.

(21) Appl. No.: 16/246,095

(22) Filed: Jan. 11, 2019

(65) Prior Publication Data

US 2020/0226267 A1 Jul. 16, 2020

(51) Int. Cl.
*H04L 29/00* (2006.01)
*G06F 21/60* (2013.01)
*G06F 16/27* (2019.01)
*H04L 9/06* (2006.01)
*H04L 9/00* (2022.01)

(52) U.S. Cl.
CPC ............ *G06F 21/602* (2013.01); *G06F 16/27* (2019.01); *H04L 9/0637* (2013.01); *H04L 9/50* (2022.05)

(58) Field of Classification Search
CPC ........ G06F 21/602; G06F 16/27; G06F 21/64; G06F 21/16; H04L 9/0637; H04L 2209/38; H04L 9/3247; H04L 9/3239; H04L 9/3297
See application file for complete search history.

(56) References Cited

U.S. PATENT DOCUMENTS

| | | | |
|---|---|---|---|
| 10,521,623 B2* | 12/2019 | Rodriguez | H04L 9/0861 |
| 10,554,401 B1* | 2/2020 | Lee | H04L 9/30 |
| 10,594,484 B2* | 3/2020 | Rodriguez | H04L 9/0822 |
| 10,699,340 B2* | 6/2020 | Gordon, III | H04L 9/0643 |
| 10,853,456 B1* | 12/2020 | Crawforth | H04L 9/3236 |
| 2008/0228580 A1* | 9/2008 | Korman | G06Q 30/02 705/14.27 |
| 2014/0196142 A1 | 7/2014 | Louboutin et al. | |
| 2015/0058623 A1 | 2/2015 | Taylor et al. | |
| 2015/0074823 A1 | 3/2015 | Wang et al. | |

(Continued)

*Primary Examiner* — Don G Zhao
(74) *Attorney, Agent, or Firm* — BakerHostetler

(57) ABSTRACT

Methods and systems for distributed ledger-based digital content distribution chain tracing may comprise receiving an indication of a content asset and an indication of a first user associated with the content asset. A first distributed ledger record may be stored and/or created on a distributed ledger comprising the indication of the content asset and the indication of the first user. A second distributed ledger record may be stored on and/or created on the distributed ledger comprising an indication of a second user associated with the content asset. A version of the content asset may be generated comprising one or more frames having a digital marker. The digital marker may comprise an indication of the first user. At least one of the first distributed ledger record or the second distributed ledger record may be determined based on the digital marker as part of tracking or tracing the content asset.

28 Claims, 10 Drawing Sheets

(56) References Cited

U.S. PATENT DOCUMENTS

| | | | |
|---|---|---|---|
| 2015/0170112 A1* | 6/2015 | DeCastro | G06Q 20/381 |
| | | | 705/39 |
| 2016/0353489 A1 | 12/2016 | Blanksby et al. | |
| 2017/0118537 A1 | 4/2017 | Stransky-Heilkron et al. | |
| 2017/0206523 A1 | 7/2017 | Goeringer et al. | |
| 2018/0096175 A1* | 4/2018 | Schmeling | G06Q 10/08 |
| 2018/0121635 A1* | 5/2018 | Tormasov | H04L 9/3297 |
| 2018/0189461 A1 | 7/2018 | Ghafourifar et al. | |
| 2018/0285217 A1* | 10/2018 | Smith | G06F 21/00 |
| 2019/0130190 A1 | 5/2019 | Raspotnik, Jr. | |
| 2019/0180291 A1* | 6/2019 | Schmeling | G16H 20/10 |
| 2019/0273607 A1* | 9/2019 | Van Der Velden | G06K 7/1417 |
| 2019/0294762 A1* | 9/2019 | Prem Bianzino | G06F 21/645 |
| 2019/0305938 A1* | 10/2019 | Sandberg-Maitland | |
| | | | H04L 9/321 |
| 2019/0306230 A1* | 10/2019 | Purushothaman | G06K 7/1413 |
| 2019/0325498 A1* | 10/2019 | Clark | G06K 7/1417 |
| 2019/0340876 A1* | 11/2019 | Northrup | H04L 63/08 |
| 2019/0349204 A1* | 11/2019 | Enke | H04L 9/0861 |
| 2019/0373339 A1* | 12/2019 | Bradley | G06F 16/1805 |
| 2019/0385269 A1* | 12/2019 | Zachary | G07C 5/008 |
| 2019/0386814 A1* | 12/2019 | Ahmed | H04L 9/3013 |
| 2020/0012765 A1* | 1/2020 | Smaiely | H04L 9/0637 |
| 2020/0084045 A1* | 3/2020 | Cohen | H04L 9/14 |
| 2020/0092240 A1* | 3/2020 | Pokharel | H04L 51/18 |
| 2020/0159890 A1* | 5/2020 | Chui | G06F 16/25 |
| 2020/0164886 A1* | 5/2020 | Dutta | G06F 21/6236 |
| 2020/0201910 A1* | 6/2020 | Gavaudan | G06Q 20/3823 |
| 2020/0226233 A1* | 7/2020 | Penugonda | G06F 21/64 |
| 2020/0349540 A1* | 11/2020 | Cho | G06F 21/10 |
| 2020/0389291 A1* | 12/2020 | Xiao | H04L 9/0637 |
| 2021/0105276 A1* | 4/2021 | Collinson | H04L 63/101 |

* cited by examiner

DISTRIBUTED LEDGER-BASED DIGITAL CONTENT TRACING

BACKGROUND

Content may be distributed to viewers. Prior to distributing content to viewers, the content may be edited by and/or sent to content handlers, such as creators and editors. Current systems may not be adapted to trace a chain of custody of the content, such as a chain of custody of the content between content handlers.

SUMMARY

Systems and methods are described for tracing a chain of custody of a content asset, using a distributed ledger. Records may be stored and/or created on the distributed ledger indicating entities that receive the content asset. A version of the content asset may be generated. The version of the content asset may comprise one or more frames having a digital marker, such as a watermark. The digital marker may comprise an indication of a record stored and/or created on the distributed ledger. The version of the content asset may be sent to an entity. The digital marker and/or the record may be used to trace the version of the content asset to the entity.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
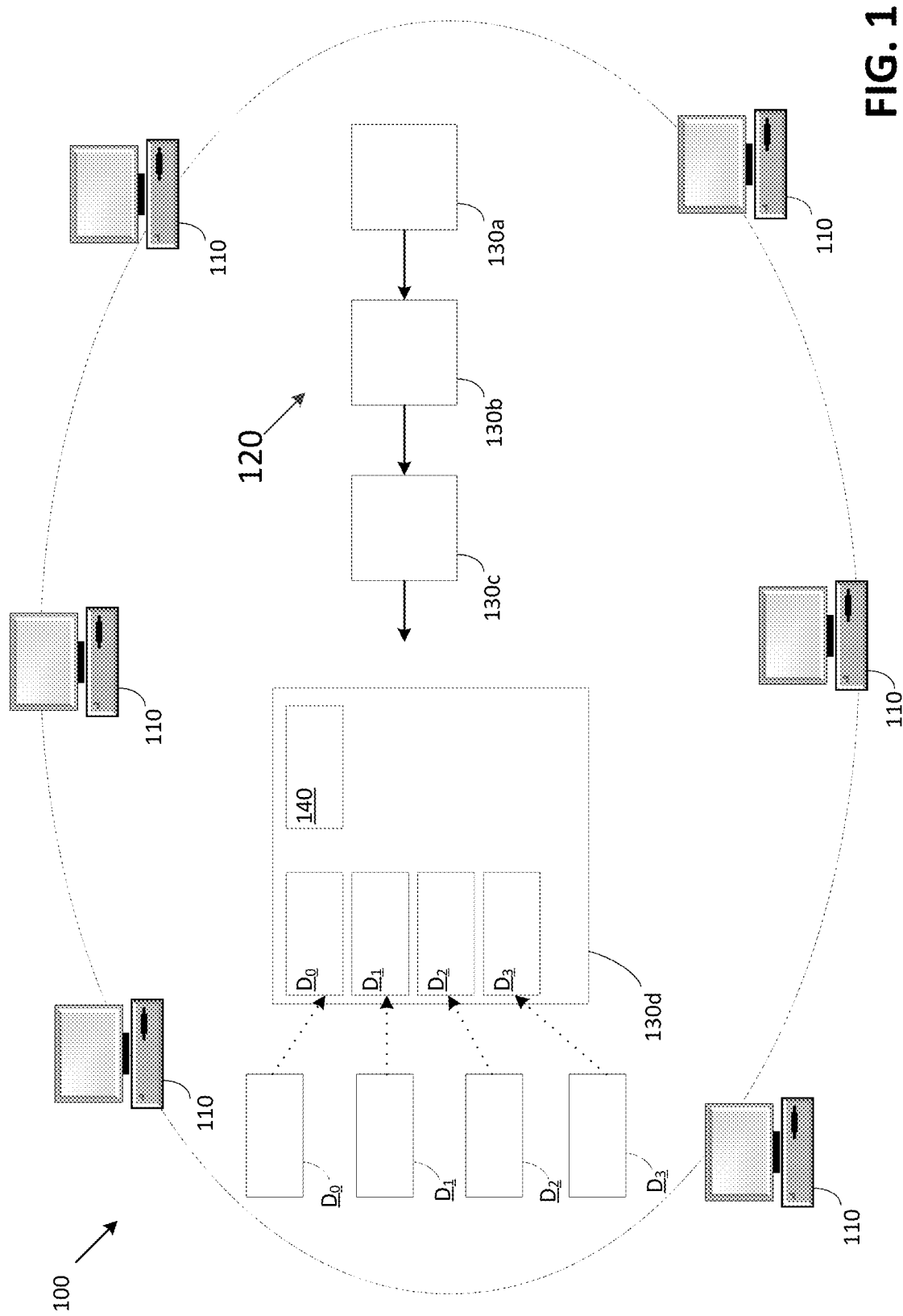
FIG. 1 shows an example distributed system architecture.

A chain of custody of a content asset may comprise a plurality of computing devices and/or users that receive and/or send the content asset. The users may comprise a source of the content asset, a creator of the content asset, an originator of the content asset, an editor of the content asset, a processor of the content asset, a distributor of the content asset, and/or a viewer of the content asset. The creator of the content asset can be any entity such as a film studio, a recording studio, or an animation studio. From a first user, the content asset may be sent to a second user and/or device in the chain. The second user may edit and/or transform the original content asset, such as by editing audio of the content asset, editing scenes of the content asset, transforming the content asset to another data type, and/or transcoding/compressing the content asset. The second user may comprise a distributor of the content asset. From the second user, the edited content asset may be sent to one or more additional users and/or devices in the chain, who may perform further processing of the edited content asset. From the second user and/or from a third user in the chain, the content asset may be sent to a content distributor and/or a viewer.

For one or more entities in the chain, a digital marker, such as a watermark indicating the entity may be added to the content asset. However, addition of a digital marker to the content asset may interfere with a digital marker previously added to the content asset. For example, the subsequent digital marker may render the previous watermark unreadable. The subsequent digital marker may contribute to degradation of the content asset, such as visible signal degrading. Degradation of the content asset may increase as the number of digital markers added to the content asset increases. Therefore, systems and methods for tracing a chain of custody of digital content, p are needed.

The systems and methods may comprise generating unique identifiers for entities that receive and/or process content assets. Distributed ledger records indicating the unique identifiers may be stored and/or created on a distributed ledger. The distributed ledger may be associated with the content asset. The distributed ledger records may comprise indications of an entity associated with the content asset, such as a source and/or creator of the content asset. The distributed ledger records may comprise indications of the content asset. The distributed ledger records may comprise indications of entities, devices, and/or users that send, receive, edit, process, have access to, and/or have possession of the content asset. The distributed ledger records may comprise indications of other distributed ledger records, such as distributed ledger records indicating entities that previously received or edited the content asset.

A version of the content asset may be generated, located, and/or received. The version of the content asset may comprise one or more frames having a digital marker, such as a watermark. The digital marker may link the version of the content asset to the distributed ledger, such as by comprising an indication of the distributed ledger. As a result, the amount of data in the digital marker may be minimized, as more extensive data may be stored in the distributed ledger and accessed based on the digital marker. The digital marker may comprise an indication of one or more of the distributed ledger records. For example, the digital marker may comprise an indication of a first distributed ledger record. The digital marker may comprise an indication of a unique identifier of one of the entities. The digital marker may comprise an indication of an entity associated with the content asset, such as a source of the content asset or a creator of the content asset. The version of the content asset may be sent to one or more of the entities.

The digital marker and the distributed ledger records may be used to determine a chain of custody of the content asset. For example, if a pirated version of the content asset is identified, based on the digital marker of the pirated version, a record on the distributed ledger may be determined. Based on the record on the distributed ledger, other distributed ledger records associated with the chain of custody of the content asset may be determined. Based on one or more of the records and/or the unique identifier, it may be determined which entity sourced the pirated version of the content asset and/or at what point in the chain of custody the sourcing of the pirated version occurred.

The distributed ledger may be stored across a distributed system. FIG. 1 shows an example distributed system. The distributed system may comprise a network 100 of nodes 110. A node 110 may comprise a computing device, a central processing unit, a graphical processing unit, a field programmable gate array, or an application specific integrated circuit. A node 110 may comprise a content distribution device, such as a cable modem, set-top box, lap top, smart phone, tablet, a portable digital assistant, a smart television, wearable computing device, mobile computing device, or any computing device in communication with a content distribution network.

The network 100 of nodes 110 may comprise a decentralized database. The decentralized database may not have a central administrator or centralized storage. For example, the nodes 110 in the network 100 may store a copy of a collection of data, such as a distributed ledger. A distributed ledger may comprise recorded entries, such as transactions. The data may be replicated, shared, or synchronized across the nodes 110. The decentralized database may be continually reconciled, such as to reflect changes to the collection of data. The nodes 110 may continually or periodically download the most recent version of the collection of data. The node 110 may automatically download the collection of data. For example, based on a node 110 joining the network 100, the node 110 may download the collection of data.

A decentralized database, may comprise a distributed ledger, such as a blockchain 120. The blockchain 120 may comprise one or more records, such as blocks 130 in which data is recorded. The blocks 130 may comprise entries or transactions indicating unique identifiers of user devices and content assets requested, accessed, or received by one or more of the user devices. The blocks 130 in the blockchain 120 may function as a mechanism to organize the data in the blockchain 120. For example, the blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network 100 may build the blockchain 120, such as by adding blocks 130 to the blockchain 120. The nodes 110 may execute several operations to build the blockchain 120. For example, based on new data $D_0, D_1, D_2, D_3$ being received by the network 100, the nodes 110 may validate the new data $D_0, D_1, D_2, D_3$. As an example, if the new data $D_0, D_1, D_2, D_3$ comprises transactions, the nodes 110 may validate, verify, or authenticate the identity of the parties to the transaction. A transaction may comprise a public key of a party to the transaction and a digital signature of the party to the transaction. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature with the public key.

The nodes 110 may collate the new data $D_0, D_1, D_2, D_3$ into a new block 130d. The nodes 110 may record one or more data entries $D_0$ in a new block 130d. The nodes 110 may execute an operation to add the new block 130d or a plurality of new blocks to the blockchain 120. For example, if the data in the blocks 130 is related chronologically, such as where the first block 130a in the chain records older data than the data of subsequent blocks 130b, 130c, the nodes 110 may perform a timestamp function to log the sequence in which blocks 130 are stored and/or created on the blockchain 120. The nodes 110 may append a hash of the previous block 130c to the new block 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the blockchain 120.

Once the operation is executed to add a new block 130d to the blockchain 120, the nodes 110 may communicate the new block 130d to the network 100. The nodes 110 may express their acceptance of the new block 130d to the blockchain 120 by working off the block 130d to add a subsequent block to the blockchain 120. If more than one version of the blockchain 120 exists, the nodes 110 may attempt to work off the longest blockchain 120. The longest blockchain 120 may be determined by an algorithm for scoring the blockchain 120. For example, a blockchain 120 may be assigned a score based on the computational work required to generate the blockchain 120. A node 110 may communicate the longest blockchain 120 that the node 110 has observed to the network 100, such as with a gossip protocol.

The network 100 may have self-correcting mechanisms, such as to address discrepancies between nodes 110 in the network 100. For example, if there is a fork in a blockchain 120, a node 110 working off one branch of the blockchain 120 may switch to a second branch of the blockchain 120, if the second branch becomes longer than the first branch. As an example, if a node 110 does not receive a block 130b, the node 110 may request the block 130b based on the node 110 receiving the next block 130c and determines that the node 110 did not receive the previous block 130b.

One or more nodes 110 in the network 100 may not participate in building the blockchain 120. The operations that the nodes 110 in the network 100 may perform associated with the blockchain may not be limited to building the blockchain 120. As an example, one or more nodes 110 may monitor the blockchain 120 for particular transactions. For example, the nodes 110 may monitor the blockchain 120 for transactions that comprise an identifier associated with a party.

Figure 2:
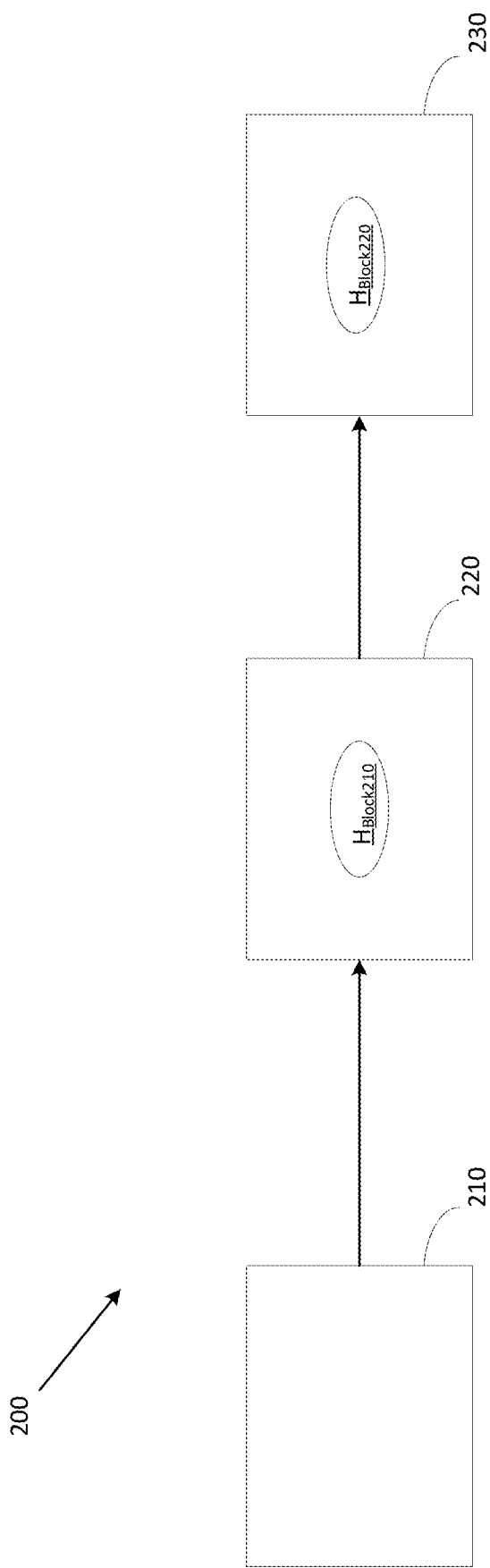
FIG. 2 shows an example distributed ledger architecture.

FIG. 2 shows an example distributed ledger. A distributed ledger may comprise a blockchain 200 in which one or more transactions are recorded in blocks 210, 220, 230. The one or more transactions will be discussed in more detail in reference to FIGS. 5 & 6 below. The blocks 210, 220, 230 may be linked in a sequence that represents the chronology of the execution, validation, or recording of the transactions. For example, the blockchain 200 may comprise a genesis block 210 that records the earliest transaction in the blockchain 200 and comprises the first block 210 in the blockchain 200. Each block 220, 230 following the genesis block 210 may record one or more transactions that were executed or validated subsequent to the transactions of the preceding block 210, 220, 230 in the blockchain 200. The transactions may indicate content assets and unique identifiers of user devices that requested, accessed, or received one or more of the content assets. Each block 210, 220, 230 may record transactions that occurred prior to the transactions of the subsequent block 220, 230 in the blockchain 200. As an example, the block 230 may record transactions that occurred after the transactions recorded in the block 220. A new transaction may be recorded in a new block. The new transaction may indicate a content asset and a unique identifier of a user device that requested, accessed, or received the content asset. The new block may be appended to the last block 230 in the blockchain 200. Although the example blockchain 200 is shown as comprising three blocks 210, 220, 230, the blockchain 200 may comprise less than three blocks or more than three blocks. The blocks 210, 220, 230 may record transactions as hashes of the transactions.

The blocks 210, 220, 230 may be connected, such as to establish the chronological order of the transactions in the blockchain 200. Each block 210, 220, 230 may comprise an indication of one or more preceding blocks 210, 220, 230 in the blockchain 200. For example, a block 210, 220, 230 may comprise an indication of a hash $H_{Block210}$, $H_{Block220}$ of the transactions in one or more preceding blocks 210, 220, 230. The linking of the blocks 210, 220, 230 may deter modification of a block 210, 220, 230 or transaction in the blockchain 200. For example, tampering with a block 210, 220, 230 may require modifying transactions in preceding blocks 210, 220, 230 of the blockchain 200.

Figure 3:
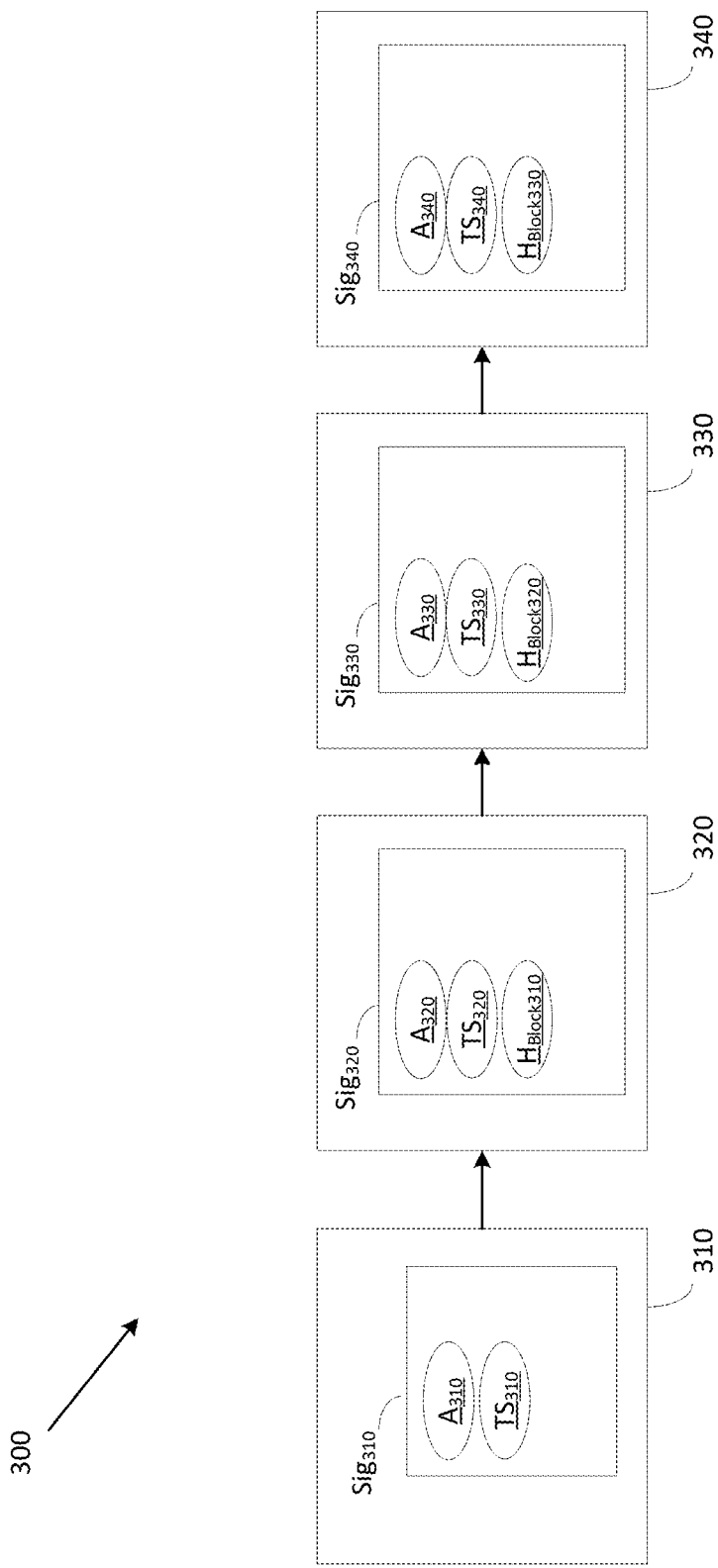
FIG. 3 shows an example distributed ledger architecture.

FIG. 3 shows an example distributed ledger. The system may comprise a distributed ledger 300. The distributed ledger may comprise a blockchain. The distributed ledger 300 may be associated with an entity, such as a service provider, content distributor, content distributor, content license manager, or content creator. The distributed ledger 300 may comprise a permissioned distributed ledger. The distributed ledger 300 may comprise a private distributed ledger. For example, the distributed ledger 300 may be accessed by content handlers.

The distributed ledger 300 may comprise a plurality of blocks 310, 320, 330, 340. Each block 310, 320, 330, 340 may comprise one or more distributed ledger entries. Each block 310, 320, 330, 340 may comprise an indication of one or more content assets requested or accessed and a unique identifier associated with a user device that requested or accessed the one or more content assets ($A_{310}$, $A_{320}$, $A_{330}$, $A_{340}$).

Each block 310, 320, 330, 340 may comprise a timestamp ($TS_{310}$, $TS_{320}$, $TS_{330}$, $TS_{340}$). The timestamp ($TS_{310}$, $TS_{320}$, $TS_{330}$, $TS_{340}$) may indicate a date or time at which the block 310, 320, 330, 340 was generated. The inclusion of the timestamps ($TS_{310}$, $TS_{320}$, $TS_{330}$, $TS_{340}$) may link the blocks 310, 320, 330, 340. Each block generated after a genesis block 320, 330, 340 may comprise a hash ($H_{Block310}$, $H_{Block320}$, $H_{Block330}$) of the previous block ($H_{Block310}$, $H_{Block320}$, $H_{Block330}$) in the distributed ledger 300. The inclusion of the hash of the previous block ($H_{Block310}$, $H_{Block320}$, $H_{Block330}$) in the distributed ledger 300 may link the blocks 310, 320, 330, 340. The inclusion of the hash of the previous blocks ($H_{Block310}$, $H_{Block320}$, $H_{Block330}$) in the distributed ledger 300 may comprise an iterative chain of hash functions. The linking of the blocks 310, 320, 330, 340 may deter unauthorized tampering or breaching of the distributed ledger 300. For example, tampering with a block 310, such as retroactively modifying the block 310, may require modification of the subsequent blocks 320, 330, 340. The computing power or labor to tamper or breach the distributed ledger 300 may deter targeting of the distributed ledger 300 by an unauthorized entity.

Each block 310, 320, 330, 340 may comprise a signature ($Sig_{310}$, $Sig_{320}$, $Sig_{330}$, $Sig_{340}$). The signature ($Sig_{310}$, $Sig_{320}$, $Sig_{330}$, $Sig_{340}$) may comprise an encryption with a key of a device that manages the distributed ledger 300, such as a private key of the device. The signature ($Sig_{310}$, $Sig_{320}$, $Sig_{330}$, $Sig_{340}$) may comprise an encryption of one or more of the content asset and/or device identifiers ($A_{310}$, $A_{320}$, $A_{330}$, $A_{340}$), the hash of the key, the timestamp ($TS_{310}$, $TS_{320}$, $TS_{330}$, $TS_{340}$), and the hash of the previous block ($H_{Block310}$, $H_{Block320}$, $H_{Block330}$). The signature ($Sig_{310}$, $Sig_{320}$, $Sig_{330}$, $Sig_{340}$) may deter unauthorized tampering with the distributed ledger 300. The private key used to sign may be necessary to generate or retroactively modify a block or record of the distributed ledger 300. Only the managing device or another entity or device having the private key may alter or add to the distributed ledger 300.

At least a portion of the data in blocks 310, 320, 330, 340 may not be encrypted. The data may not be encrypted in order for the data to be accessible to a plurality of entities. For example, the data may not be encrypted so that the data may be accessed by technology groups involved in the development of digital marker detection and piracy source identification, digital marker technology vendors, content creators, and content sources. The data may not be encrypted to facilitate ease of access and sharing of the data, such as in order to foster cooperation between the technology groups and vendors. The data in blocks 310, 320, 330, 340 may comprise data associated with access to digital content, such as indications of content and indications of user devices requesting the content.

The distributed ledger 300 may comprise a genesis block 310. The genesis block 310 may comprise the first block of the distributed ledger 300. The genesis block 310 may comprise the oldest block or the first block generated of the distributed ledger 300. The device configured to manage the distributed ledger 300 may generated the genesis block 310. The managing device may send an indication of the genesis block 310 to other managing devices. The managing device may store synchronized versions of the distributed ledger 300. The managing device may store synchronized versions of the distributed ledger 300 based on receiving the indication of the genesis block 310. One or more of the managing devices may generate the subsequent blocks 320, 330, 340 of the distributed ledger 300.

The distributed ledger 300 may comprise a component of a distributed ledger. The distributed ledger 300 may comprise a branch of another blockchain, such as a general blockchain. The general blockchain may comprise a plurality of branches. Each of the plurality of branches may comprise a blockchain or another plurality of blockchains. The general blockchain may comprise a plurality of blockchains. For example, each of the plurality of blockchains may be associated with a different content distributor. Each of the plurality of blockchains may comprise a register of content associated with the respective content distributor that was requested or accessed.

The distributed ledger 300 may be stored at a distributed network. The distributed ledger 300 may be stored across nodes, such as the nodes 110 of FIG. 1, in a distributed network, such as the network 100 of FIG. 1. The nodes may comprise computing devices. The nodes may comprise systems that perform operations associated with one or more of content creation, content distribution, digital marker creation, digital marker extraction, piracy source identification, piracy prevention, and law enforcement.

The distributed ledger 300 may be updated. Updating the distributed ledger 300 may comprise generating a distributed ledger. Updating the distributed ledger 300 may comprise sending a distributed ledger to the distributed ledger 300 or a network. Updating the distributed ledger may comprise recording the distributed ledger in a block 310, 320, 330, 340 of the distributed ledger 300. Updating the blockchain may comprise generating a block 310, 320, 330, 340 of the distributed ledger 300. The distributed ledger 300 may be updated by a computing device or an application.

The distributed ledger 300 may be updated using a custom software library. Updating the distributed ledger 300 may comprise performing underlying blockchain integration, such as adding a new block to the blockchain.

Figure 4:
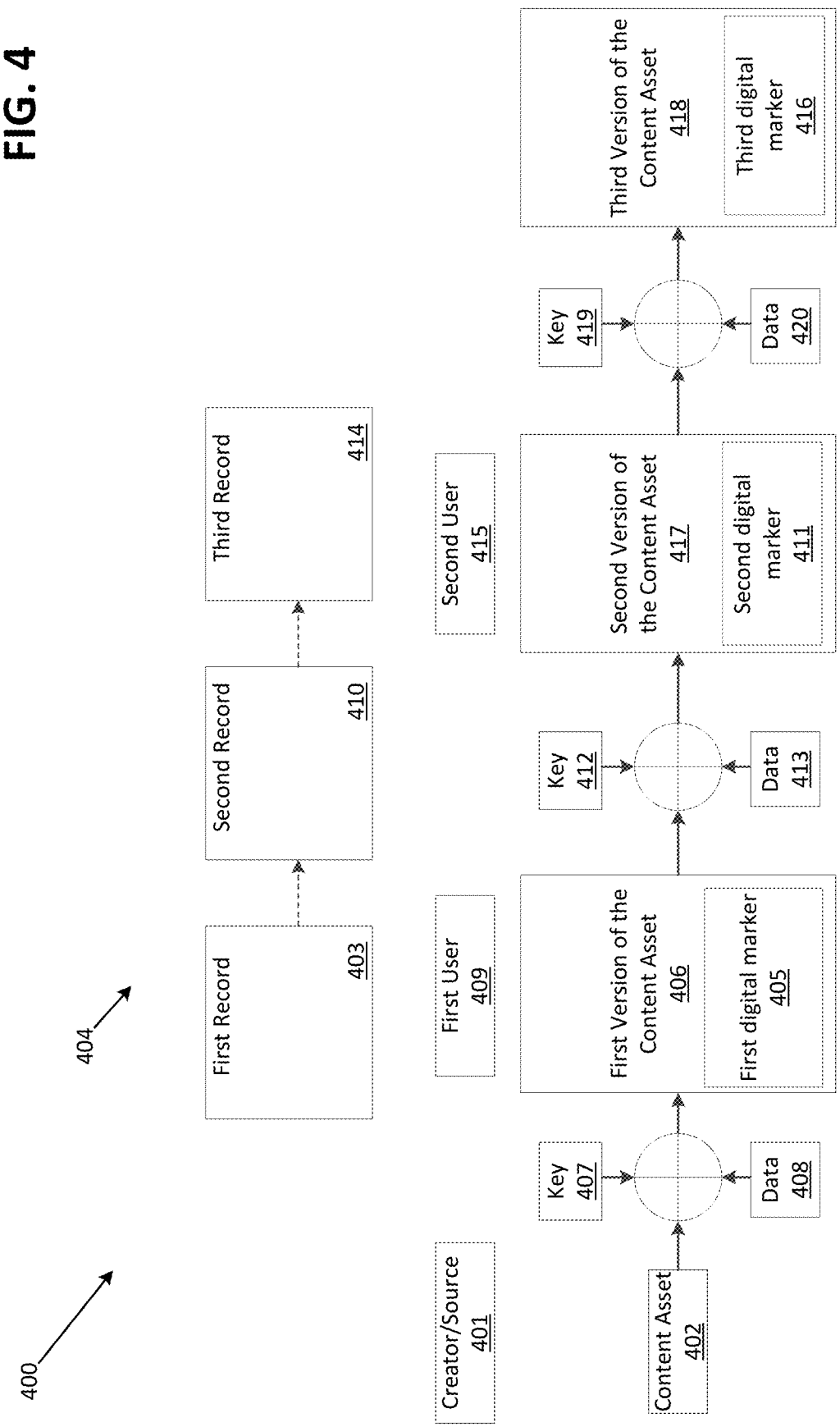
FIG. 4 shows an example method.

FIG. 4 shows an example method 400. A content source and/or creator 401 may generate a content asset 402. A first record 403 may be stored and/or created on a distributed ledger 404. The first record 403 may comprise an indication of the content asset 402. The first record 403 may comprise an indication of the creator 401.

A first digital marker 405, such as a watermark, may be embedded in the content asset 402, such as by generating a first version of the content asset 406 comprising the first digital marker 405. The first digital marker 405 may comprise a key 407. The first digital marker 405 may comprise data 408, such as an indication of the distributed ledger 404 and/or an indication of the first record 403.

The first version of the content asset 406 may be sent to a first user 409 (e.g., an entity, a creator, an originator, an editor, a processor, a distributor, a viewer). The first version of the content asset 406 may be sent to a first user 409 based on receiving a request from the first user 409. A second record 410 may be stored and/or created on the distributed ledger 404. The second record 410 may comprise an indication of the first record 403. The second record 410 may comprise an indication of the creator 401. The second record 410 may comprise an indication of the creator 401. The second record 410 may comprise an indication of a date and/or time that the first version of the content asset 406 was sent to the first user 409.

The first user 409 may edit the first version of the content asset 406. A second digital marker 411 may be embedded in the first version of the content asset 406, such as the first version of the content asset 406 edited by the first user 409. Embedding the second digital marker 411 may comprise generating, locating, and/or receiving a second version of the content asset 417 comprising the second digital marker 411. In the second version of the content asset 417, the second digital marker 411 may overlay the first digital marker 405. The second digital marker 411 may comprise a key 412. The second digital marker 411 may comprise data 413, such as an indication of the distributed ledger 404 and/or an indication of the second record 410.

The second version of the content asset L may be sent to a second user 415 (e.g., an entity, a creator, an originator, an editor, a processor, a distributor, a viewer). A third record 414 may be stored and/or created on the distributed ledger 404. The third record 414 may comprise an indication of the second record 410 and/or the first record 403. The third record 414 may comprise an indication of the creator 401, the first user 409, and/or the second user 415. The third record 414 may comprise an indication of a date and/or time that the second version of the content asset 417 was sent to the second user 415.

The second user 415 may edit the second version of the content asset 417. A third digital marker 416 may be embedded in the second version of the content asset 417, such as the second version of the content asset 417 edited by the second user 415. Embedding the digital marker 416 may comprise generating a third version of the content asset 418. In the third version of the content asset 418, the third digital marker 416 may overlay the second digital marker 411 and/or the first digital marker 411. The digital marker 416 may comprise a key 419. The digital marker 416 may comprise data 420, such as an indication of the distributed ledger 404 and/or an indication of the third record 414.

However, the subsequently added digital markers 411, 416 may interfere with the originally added first digital marker 405. For example, the subsequent digital markers 411, 416 may render the original watermark 405 unreadable. The subsequent digital markers 411, 416 may contribute to degradation of the content asset 402, such as visible signal degrading. Degradation of the content asset 402 may increase as the number of digital markers added to the content asset 402 increases.

Figure 5:
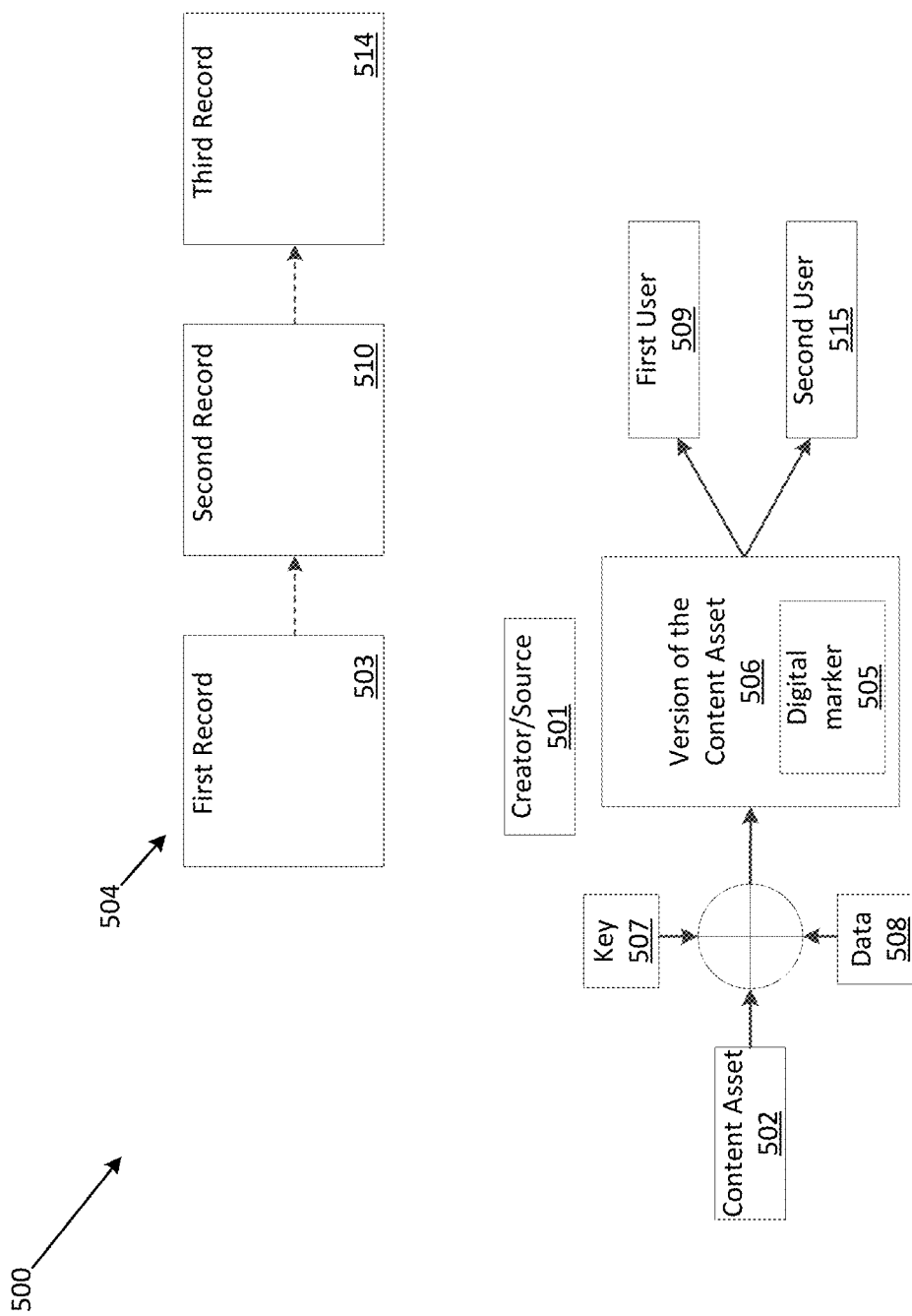
FIG. 5 shows an example method.

FIG. 5 shows an example method 500. A content source and/or creator 501 may generate a content asset 502. A first record 503 may be stored and/or created on a distributed ledger 504. The first record 503 may comprise an indication of the content asset 502. The first record 503 may comprise an indication of the creator 501.

A digital marker 505, such as a watermark, may be embedded in the content asset 502, such as by generating, locating, and/or receiving a first version of the content asset 506 comprising the digital marker 505. The digital marker 505 may comprise a key 507. The digital marker 505 may comprise data 508, such as an indication of the distributed ledger 504 and/or an indication of the first record 503.

The version of the content asset 506 may be sent to a first user 509 (e.g., an entity, a creator, an originator, an editor, a processor, a distributor, a viewer). The version of the content asset 506 may be sent to a first user 509 based on receiving a request from the first user 509. A second record 510 may be stored and/or created on the distributed ledger 504. The second record 510 may comprise an indication of the first record 503. The second record 510 may comprise an indication of the creator 501. The second record 510 may comprise an indication of the first user 509. The second record 510 may comprise an indication of a date and/or time that the version of the content asset 502 was sent to the first user 509.

The first user 509 may edit the version of the content asset 506. The version of the content asset 506, such as the version of the content asset 506 edited by the first user 509, may be sent to a second user 515 (e.g., an entity, a creator, an originator, an editor, a processor, a distributor, a viewer). A third record 514 may be stored and/or created on the distributed ledger 504. The third record 514 may comprise an indication of the second record 510 and/or the first record 503. The third record 514 may comprise an indication of the creator 501, the first user 509, and/or the second user 515. The third record 514 may comprise an indication of a date and/or time that the version of the content asset 506 was sent to the second user 515.

The second user 515 may edit the version of the content asset 506. The version of the content asset 506 may be sent to and/or edited by other entities. The digital marker 505 may remain in the version of the content asset 506 as it is sent and/or edited. As in the method 400 in FIG. 4, in which subsequent digital markers may be added to a version of a content asset. However, as subsequent digital markers are added to the version of the content asset 506, such as overlaying the digital marker 505, the quality of the digital marker 505 and/or of the version of the content asset 506 may degrade.

Alternatively and as shown in method 500, subsequent digital markers may not be added to the version of the content asset 506. Not adding subsequent digital markers to the version of the content asset 506 may preserve the quality of the version of the content asset 506 or prevent degradation of the version of the content asset 506. The digital marker 505 may be removed, such as by the creator 501. Another digital marker may be added to the content asset, such as a digital marker comprising indications of the entities that were received and/or sent the content asset. The added digital marker may comprise indications of the records on the distributed ledger.

Figure 6:
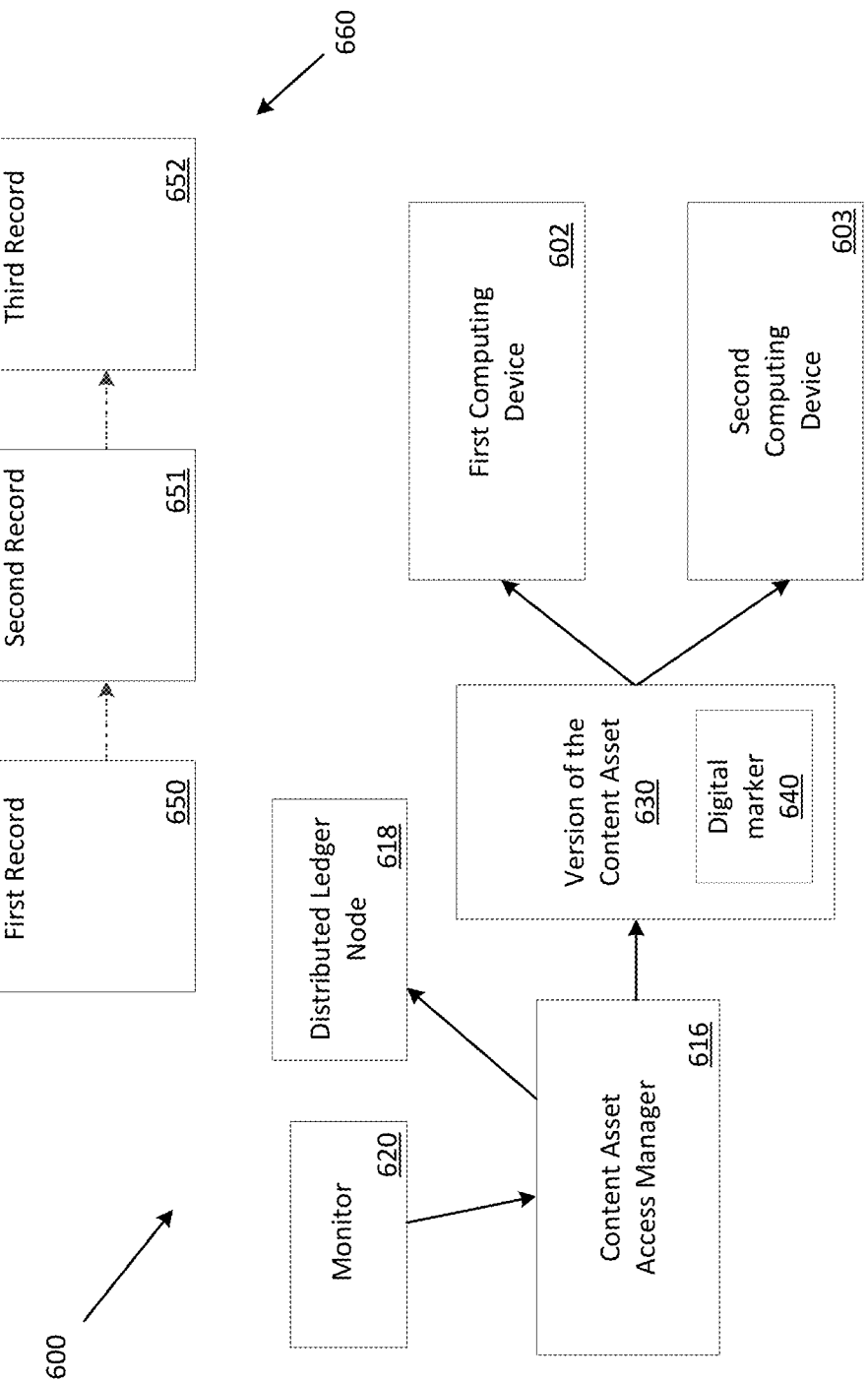
FIG. 6 shows an example system environment.

FIG. 6 shows an example system environment 600. The system environment 600 may comprise a content asset access manager 616, a user computing device 602, a distributed ledger node 618, and/or a monitor 620. The content asset access manager 616 may comprise a computing device. The content asset access manager 616 may comprise one or more computing devices. For example, the content asset access manager 616 may comprise a license server. The content asset access manager 616 may comprise content asset storage devices.

The content asset access manager 616 may receive an indication of a content asset. The content asset access manager 616 may receive an indication of a source and/or creator of the content asset. The creator of the content asset may comprise an original creator of the content asset, such as a film studio, a recording studio, and/or an animation studio. The indication of the creator may comprise a name of the creator. The indication of the creator may comprise a unique identifier associated with the creator, such as a key.

The content asset access manager 616 may cause a first distributed ledger record 650 to be stored and/or created on a distributed ledger 660. The distributed ledger 660 may be similar to any of distributed ledgers 120 in FIG. 1, 200 in FIG. 2, or 300 in FIG. 3. The distributed ledger 660 may comprise a curated distributed ledger. For example, the distributed ledger 660 may be curated by a holder of rights to digital content or a distributor of digital content. The distributed ledger 660 may comprise a permissioned distributed ledger. For example, the distributed ledger 660 may be accessible to handlers of digital content, such as entities involved in the processing and/or editing of digital content after generation of the digital content.

The distributed ledger 660 may be stored and/or created on one or more distributed ledger nodes 618. The nodes 618 may be similar to the nodes 110 in FIG. 1. The distributed ledger 660 may be stored on the content asset access manager 616. The distributed ledger 660 may comprise a blockchain. Records 650, 651, 652 stored and/or created on the distributed ledger 660 may each comprise a blockchain transaction. Records 650, 651, 652 stored and/or created on the distributed ledger 660 may each comprise a blockchain block. The content asset access manager 616 may be configured to cause the records 650, 651, 652 to be stored and/or created on the distributed ledger 660 by causing the transactions to be stored and/or created on a block of the blockchain. The distributed ledger 660 may be stored and/or created on one or more distributed ledger nodes 618. The content asset access manager 616 may be configured to cause the first distributed ledger record 650 to be stored and/or created on the distributed ledger 660 by sending an indication of the first distributed ledger record 650 to at least one of the nodes 618.

The first distributed ledger record 650 may comprise the indication of the content asset. The first distributed ledger record 650 may comprise the indication of the creator. The content asset access manager 616 may cause the first distributed ledger record 650 to be stored and/or created on the distributed ledger 660 by sending an indication of the creator and/or the content asset to the distributed ledger node 618. In addition or alternatively, the content asset access manager 616 may store the first distributed ledger 650 to the distributed ledger 660 directly, such as if the distributed ledger 660 is stored and/or created on the content asset access manager 616.

The content asset access manager 616 may receive a request. The request may comprise an indication of the content asset. The request may comprise an indication of an entity associated with the request. The entity may be involved in processing of content assets, such as editing of content assets. The entity may comprise a content distributor. The entity may be associated with the entity computing device 602. The request may be received from the entity computing device 602.

A unique identifier associated with the entity may be generated. The unique identifier may be generated based on the request. The unique identifier may be generated independent of the request. For example, unique identifiers may be generated for known entities and/or users that will source, send, receive, edit, process, have access to, and/or have possession of the content asset, such as a source and/or creator of the content asset, an editor of the content asset, a processor of the content asset, a distributor of the content asset, and/or a viewer of the content asset.

The unique identifier may comprise a series of alphanumeric characters. The unique identifier may comprise binary data. The unique identifier may comprise a unique key, such as a cryptographic key. The unique identifier may comprise a series of hashes of the unique function, such as with a deterministic function. The unique identifier may be different from other identifiers associated with other devices.

The unique identifier may be stored at the content asset access manager 616. The unique identifier may be sent to the computing device 602. The unique identifier may be stored and/or created on the computing device 602, such as in a secure memory of the computing device 602. For example, if the unique identifier comprises a unique key, the unique key may be stored in a wallet on the computing device 602. The unique identifier may be stored in a database of unique identifiers.

The content asset access manager 616 may cause a second distributed ledger record 651 to be stored and/or created on the distributed ledger 660. The content asset access manager 616 may cause the second distributed ledger record 651 to be stored on the distributed ledger 660 based on the request. The content asset access manager 616 may cause the second distributed ledger record 651 to be stored and/or created on the distributed ledger 660 independent of the request. For example, a distributed ledger record may be stored and/or created on the distributed ledger 660 for known entities and/or users that will source, send, receive, edit, process, have access to, and/or have possession of the content asset, such as a source and/or creator of the content asset, an editor of the content asset, a processor of the content asset, a distributor of the content asset, and/or a viewer of the content asset. The distributed ledger records 650, 651, 652 may be stored and/or created on the distributed ledger 660 in a sequence that corresponds to a sequence in which the entities and/or users will send, receive, edit, process, have access to, and/or have possession of the content asset. For example, the distributed ledger records 650, 651, 652 may be connected, such as to establish the chronological order in which the records 650, 651, 652 were stored and/or created on the distributed ledger 660. The chronological order in which the records 650, 651, 652 were stored and/or created on the distributed ledger 660 may correspond to a chronological order in which the content asset or versions of the content asset are sent to entities. The records 650, 651, 652 may comprise an indication of one or more preceding records in the distributed ledger 660. For example, the record 650, 651, 652 associated with the computing device 602 may comprise an indication of a hash of the one of the preceding records. The linking of the records 650, 651, 652 may deter modification of a record on the distributed ledger 660.

The second distributed ledger record 651 may comprise an indication of the unique identifier of the user. The second distributed ledger record 651 may comprise an indication of the content asset. The second distributed ledger record 651 may comprise an indication that the content asset was requested, accessed, and/or sent to the computing device 602. The second distributed ledger record 651 may comprise an indication of a source of the content asset, such as a user that sends a version of the content asset to the computing device 602 or a user that received and/or sent the content asset prior to the user receiving and/or sending the content asset. The second distributed ledger record 651 may comprise an indication of the creator, such as a unique identifier associated with the creator. The second distributed ledger record 651 may comprise an indication of a storage location from which the content asset is sent or copied. The second distributed ledger record 651 may comprise an indication of a time that the content asset is requested, accessed, or sent to the computing device 602.

The content asset access manager 616 may cause a version of the content asset 630 to be generated. The content asset access manager 616 may cause the version of the content asset 630 to be generated based on the request. The content asset access manager 616 may cause the version of the content asset 630 to be generated based on the indication of the creator. The content asset access manager 616 may cause the version of the content asset 630 to be generated by sending the indication of the creator and/or the indication of the content asset to a digital rights management (DRM) packager. The content asset access manager 616 may comprise the DRM packager. The DRM packager may comprise one or more computing devices that are configured to generate, locate, and/or receive a version of a digital content asset that comprises a digital marker, such as a watermark.

The version of the content asset 630 may comprise a plurality of frames. A digital marker 640, such as a watermark or a digital fingerprint, may be embedded in one or more of the frames. The digital marker 640 may comprise code embedded in a codec of the content asset, such as in a codec of the one or more frames of the content asset.

The digital marker 640 may be invisible. The digital marker 640 may comprise an image or a pattern. The digital marker 640 may be opaque, transparent, or semi-transparent. The digital marker 640 may comprise text, such as indication of metadata associated with the content asset. The metadata may comprise the indication of the creator. The metadata may comprise an indication of the distributed ledger 660. The metadata may comprise an indication of the first distributed ledger record 650. The metadata may comprise an indication of the second distributed ledger record 651. The digital marker 640 may overlay at least a portion of one or more frames of the content asset.

The digital marker 640 may be indelibly embedded in the frames of the content asset. For example, the indelibly embedded digital marker 640 may be configured to remain embedded in the frames of the content asset if the content asset is copied, transformed (e.g., converted to analog or digital, frame size is changed, effects are added), or moved from one storage medium to another storage medium. The digital marker 640 may be generated using technology of a third-party vendor. The technology may comprise a proprietary digital marker or watermarking technology. The first version of the content asset 630 may be generated, receiving, and/or receiving using an original version of the content asset from the creator. The original version may comprise an unedited version of the content asset. The original version may comprise an uncompressed version of the content asset.

The content asset access manager 616 may send the version of the content asset 630 to the computing device 602. The content asset access manager 616 may store the version of the content asset 630 to a storage accessible to the computing device 602. The content asset access manager 616 may send and/or store the version of the content asset 630 based on the request.

The computing device 602 may remove the digital marker 640 from the version of the content asset 630. The computing device 602 may be authorized to remove the digital marker 640 from the version of the content asset. For example, the computing device 602 may receive a key or other information configured to enable removal of the digital marker 640. The key or other information may be received from the content asset access manger. The computing device 602 may cause another version of the content asset to be generated, located, and/or received. The new version of the content asset may comprise one or more frames having another digital marker. The other digital marker may comprise metadata. The metadata may be different than the metadata of the digital marker 640. For example, the metadata may indicate a recipient of the new version of the content asset. The recipient of the new version of the content asset may receive the new version of the content asset from the computing device 602.

The computing device 602 may send a confirmation of receipt of the version of the content asset 630, such as to the content asset access manager 616. Another record may be stored and/or created on the distributed ledger 660 indicating receipt of the version of the content asset 630. The record may indicate a time of the receipt of the version of the content asset 630.

Subsequent records may be stored and/or created on the distributed ledger 660 indicating unique identifiers of other users (e.g., a second user, a third user, etc.) sourcing, sending, receiving, editing, processing, having access to, and/or having possession of the content asset. Although FIG. 6 shows three records 650, 651, 652 stored on the distributed ledger 660, more or less than three records may be stored and/or created on the distributed ledger 660.

The version of the content asset 630 may be sent to the other entities. The digital marker 640 indicating the distributed ledger record 660 may preclude the need to add additional digital markers to the content asset each time the content asset is sent to a user, such as to record the chain of custody of the content asset. For example, based on the digital marker 640, the first record 650 and/or the second record 651 may be determined and/or accessed. Based on the first record 650 and/or the second record 651, another distributed ledger record associated with the content asset may be determined. For example, the second record 651 may be determined based on the first record 650. The second record 651 may be determined based on common data in the first record 650 and the second record 651. Based on the distributed ledger records associated with the content asset, it may be determined what entities and/or users, sourced, sent, requested, received, edited, processed, accessed, and/or possessed the content asset.

The content asset access manager 616 may remove the digital marker 640 from the version of the content asset 630, such as before distributing the content asset and/or after pre-distribution editing of the content asset. The content asset access manager 616 may add a new digital marker to the version of the content asset 630. The new digital marker may comprise an indication of all of the entities that performed editing of the content asset. The new digital marker may comprise an indication of some or all of the records on the distributed ledger 660, such as records that were added to the distributed ledger 660 after the version of the content asset 630 comprising the first digital marker was generated.

Pirated content may comprise a version of a content asset that was made, accessed, and/or sent without the authorization of a rights holder of the content. If potentially pirated content is determined, the indication of the unique identifier and/or the indication of the distributed ledger record may be determined from the digital marker of the potentially pirated content. For example, a digital marker extraction technique may be used to extract the unique identifier and/or the indication of the distributed ledger record from the digital marker. The digital extraction method used may be based on the type of digital marker. For example, a proprietary digital extraction method of a digital marker vendor may be used to extract metadata from a digital marker generated using technology of the digital marker vendor. If the type of digital marker or the extraction method is not known, various extraction methods may be performed until one results in extraction of the metadata.

A monitor 620 may comprise a computing device associated with a user that traces chains of custody of content, a forensics services provider, or a piracy monitoring agency. The monitor 620 may be determine a version of the content asset. The version of the content asset may comprise the generated version of the content asset 630. The version of the content asset may comprise a pirated version of the content asset, such as a version of the content asset that is distributed without the authority of a rights holder of the content asset. The version of the content asset may comprise one or more frames having a digital marker. The monitor 620 may extract data from the digital marker. For example, the monitor 620 may extract the indication of the creator, the first user, and/or the second user from the digital marker. The monitor 620 may extract the indication of the first distributed ledger record, the second distributed ledger record, and/or the third distributed ledger record.

The monitor 620 may determine the distributed ledger 460 associated with the content asset. The monitor 620 may search the distributed ledger 660 for a distributed ledger record (e.g., any of distributed ledger records 650, 651, 652) comprising any of the data extracted from the digital marker. The monitor 620 may locate the distributed ledger record. Based on the distributed ledger record, the monitor 620 may determine which trace the chain of custody of the version of the content asset. Based on the chain of custody, the monitor 620 may determine which user sourced the version of the content asset, such as to determine where in the chain the piracy occurred. If the digital marker comprises an indication of the user, the monitor 620 may confirm that the version was sent and/or received by the user based on the distributed ledger record. The monitor 620 may use more than one of the records stored and/or created on the distributed ledger record to determine the chain of custody of the versions of the content asset. Based on the determination that the user associated with the unique identifier was a source of the pirated content, legal action may be taken against the user.

Figure 7:
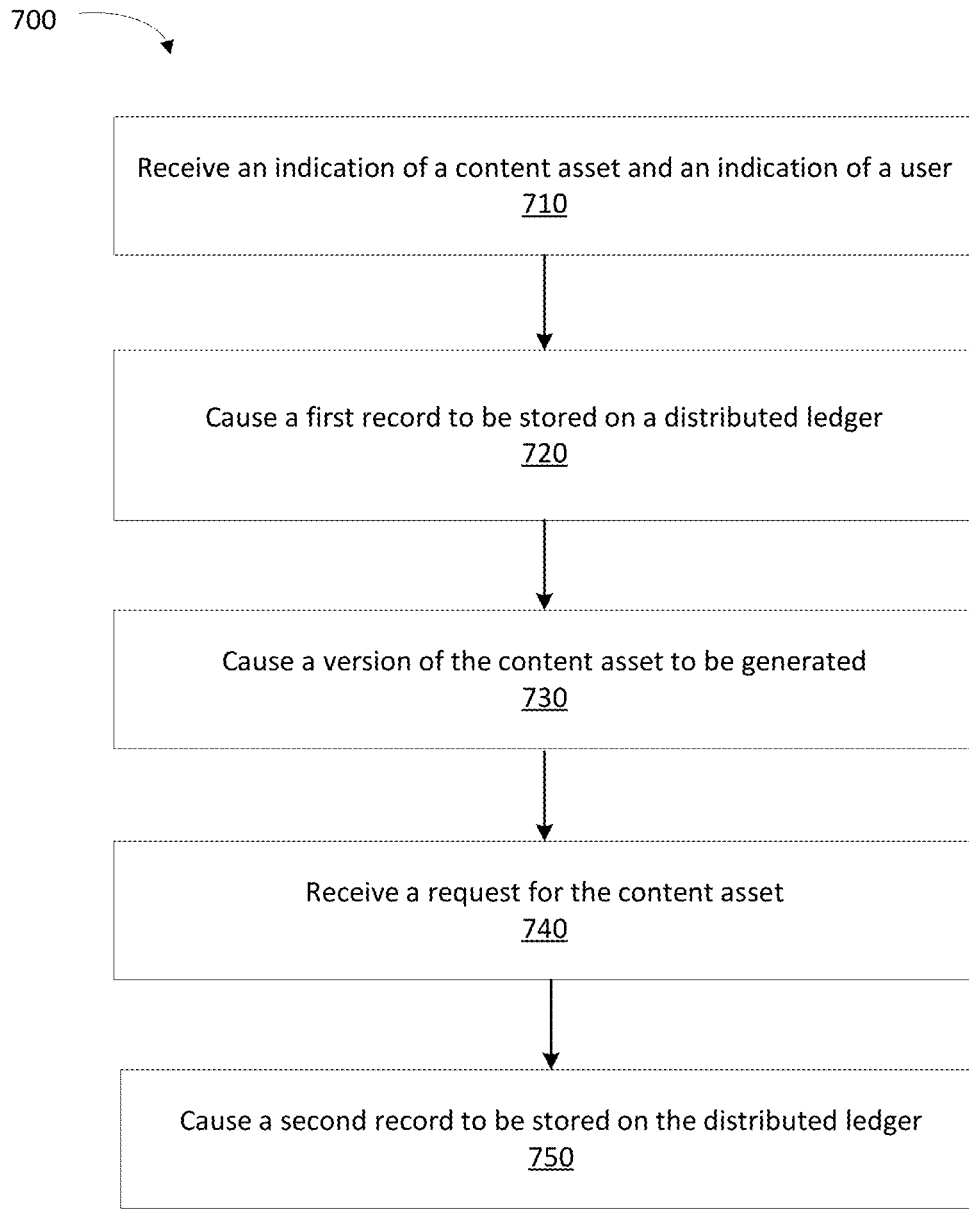
FIG. 7 shows a flow diagram of an example method.

FIG. 7 shows an example method 700. At step 710, an indication of a content asset and an indication of a source and/or creator of the content asset may be received. The creator of the content asset may comprise an original creator of the content asset, such as a film studio, a recording studio, and/or an animation studio. The indication of the creator may comprise a name of the producer. The indication of the creator may comprise a unique identifier associated with the creator.

At step 720, a first distributed ledger record may be caused to be stored and/or created on a distributed ledger. The distributed ledger may be similar to any of distributed ledgers 120 in FIG. 1, 200 in FIG. 2, or 300 in FIG. 3. The distributed ledger may be stored and/or created on one or more distributed ledger nodes. The nodes may be similar to the nodes 110 in FIG. 1. The distributed ledger may comprise a blockchain. The distributed ledger record may comprise a blockchain transaction. The distributed ledger record may comprise a blockchain block. The distributed ledger record may be caused to be stored and/or created on the distributed ledger by causing the transaction to be stored and/or created on the block of the blockchain. The distributed ledger may be stored and/or created on one or more distributed ledger nodes.

The first distributed ledger record may comprise the indication of the content asset. The first distributed ledger record may comprise the indication of the creator. The first distributed ledger record may be caused to be stored and/or created on the distributed ledger by sending an indication of the creator and/or the content asset to a distributed ledger node.

At step 730, a version of the content asset may be caused to be generated, located, and/or received. The version of the content asset may be caused to be generated, located, and/or received based on the indication of the creator. The version of the content asset may be caused to be generated, located, and/or received by sending the indication of the creator and/or the indication of the content asset to a digital rights management (DRM) packager. The DRM packager may comprise one or more computing devices that are configured to generate, locate, and/or receive a version of a digital content asset that comprises a digital marker, such as a watermark.

The version of the content asset may comprise a plurality of frames. A first digital marker, such as a watermark or a digital fingerprint, may be embedded in one or more of the frames. The first digital marker may comprise code embedded in a codec of the content asset, such as in a codec of the one or more frames of the content asset.

The first digital marker may be invisible. The first digital marker may comprise an image or a pattern. The first digital marker may be opaque, transparent, or semi-transparent. The first digital marker may comprise text, such as indication of metadata associated with the content asset. The metadata may comprise the indication of the creator. The metadata may comprise an indication of the distributed ledger. The metadata may comprise an indication of the first distributed ledger record, such as an indication of a hash of the preceding record on the distributed ledger. The first digital marker may overlay at least a portion of one or more frames of the content asset.

The first digital marker may be indelibly embedded in the frames of the content asset. For example, the indelibly embedded first digital marker may be configured to remain embedded in the frames of the content asset if the content asset is copied, transformed (e.g., converted to analog or digital, frame size is changed, effects are added), or moved from one storage medium to another storage medium. The first digital marker may be generated using technology of a third-party vendor. The technology may comprise a proprietary digital marker or watermarking technology. The version of the content asset may be generated using an original version of the content asset from the creator.

At step 740, a request for the content asset may be received. The request may comprise an indication of the content asset. The request may comprise an indication of a user associated with the request. The user may be involved in processing of content assets, such as editing of content assets. The request may be received from a computing device associated with the user.

A unique identifier associated with the user may be generated. The unique identifier may be generated based on the request. The unique identifier may be generated independent of the request. For example, unique identifiers may be generated for known entities and/or users that will source, send, receive, request, process, edit, access, and/or possess the content asset.

The unique identifier may comprise a series of alphanumeric characters. The unique identifier may comprise binary data. The unique identifier may comprise a unique key, such as a cryptographic key. The unique identifier may comprise a series of hashes of the unique function, such as with a deterministic function. The unique identifier may be different from other identifiers associated with other devices.

The unique identifier may be sent to the computing device. The unique identifier may be stored on the computing device, such as in a secure memory of the computing device. For example, if the unique identifier comprises a unique key, the unique key may be stored in a wallet on the computing device. The unique identifier may be stored in a database of unique identifiers. The database may be devoid of personal identifying information (PII).

At step 750, a second distributed ledger record may be caused to be stored and/or created on the distributed ledger. The second distributed ledger record may be caused to be stored based on the request. The second distributed ledger record may be caused to be stored and/or created on the distributed ledger independent of the request. For example, a distributed ledger record may be stored and/or created on the distributed ledger for each known entities and/or users that will source, send, request, receive, edit, process, access, and/or possess the content asset, such as prior to receiving the request.

The distributed ledger records may be stored and/or created on the distributed ledger in a sequence that corresponds to a sequence in which the entities and/or users will source, send, request, process, edit, access, and/or possess the content asset. For example, the distributed ledger records may be connected, such as to establish the chronological order in which the records were stored and/or created on the distributed ledger. The chronological order in which the records were stored and/or created on the distributed ledger may correspond to a chronological order in which the content asset or versions of the content asset are sent to entities. A record may comprise an indication of one or more preceding records in the distributed ledger. For example, the record associated with the computing device may comprise an indication of a hash of the one of the preceding records. The linking of the records may deter modification of a record on the distributed ledger.

The second distributed ledger record may comprise an indication of the unique identifier of the user. The second distributed ledger record may comprise an indication of the content asset. The second distributed ledger record may comprise an indication that the content asset was requested, accessed, and/or sent to the computing device. The second distributed ledger record may comprise an indication of a source of the content asset, such as a user that sends a version of the content asset to the computing device. The second distributed ledger record may comprise an indication of the creator, such as a unique identifier associated with the creator. The second distributed ledger record may comprise an indication of a storage location from which the content asset is sent or copied. The second distributed ledger record may comprise an indication of a time that the content asset is requested, accessed, or sent to the computing device.

The version of the content asset may be sent to the computing device. The version of the content asset may be stored to a storage accessible to the computing device. The version of the content asset may be sent and/or stored based on the request.

An indication that the computing device received the version of the content asset may be received. A third record may be stored and/or created on the distributed ledger. A third record may be stored and/or created on the distributed ledger based on the computing device receiving the version of the content asset, The third record may comprise an indication of receipt of the version of the content asset. The third record may comprise an indication of a time of the receipt of the version of the content asset. The computing device may cause the third record to be stored and/or created on the distributed ledger. Causing the record to be stored may comprise sending an indication (e.g., of the third record and/or of the receipt of the second version of the content asset) to a node of the distributed ledger.

Subsequent records may be stored and/or created on distributed ledger indicating unique identifiers of other entities and/or users sourcing, sending, receiving, requesting, producing, editing, accessing, and/or possessing the content asset. The subsequent records may be stored based on requests associated with the other entities. The steps of method 500 may be performed in a different order. One or more steps may be omitted. One or more steps may be repeated. Additional steps may be performed.

As an example, a recording studio may film a video. A first record may be stored and/or created on a distributed ledger indicating the video. The first record may comprise an indication of a unique key associated with the recording studio. A version of the video may be generated, located, and/or received comprising frames having a digital marker. The digital marker may comprise an indication of the recording studio and/or the first record.

An indication of a picture editor may be received. The picture editor may be involved in cutting and/or rearranging scenes of video. The picture editor may be involved in adding special effects and/or text to video. A second record may be stored and/or created on the distributed ledger. The second record may comprise an indication of a unique key of the picture editor. The second record may comprise a hash of the first record. The version of the video may be sent to the picture editor, such as to a device associated with the picture editor.

An indication of an audio editor may be received. A third record may be stored and/or created on the distributed ledger. The third record may comprise an indication of a unique key associated with the audio editor. The third record may comprise a hash of the second record. The version of the video may be sent to the audio editor, such as from the device associated with the picture editor or a device that received the edited video from the picture editor.

An indication of a content distributor may be received. The content distributor may be involved in compressing of video. The content distributor may be involved in making video available to viewers. The content distributor may be involved in multiplexing video and audio, such as in a data stream. A fourth record may be stored and/or created on the distributed ledger. The fourth record may comprise an indication of a unique key associated with the content distributor. The fourth record may comprise a hash of the third record.

Figure 8:
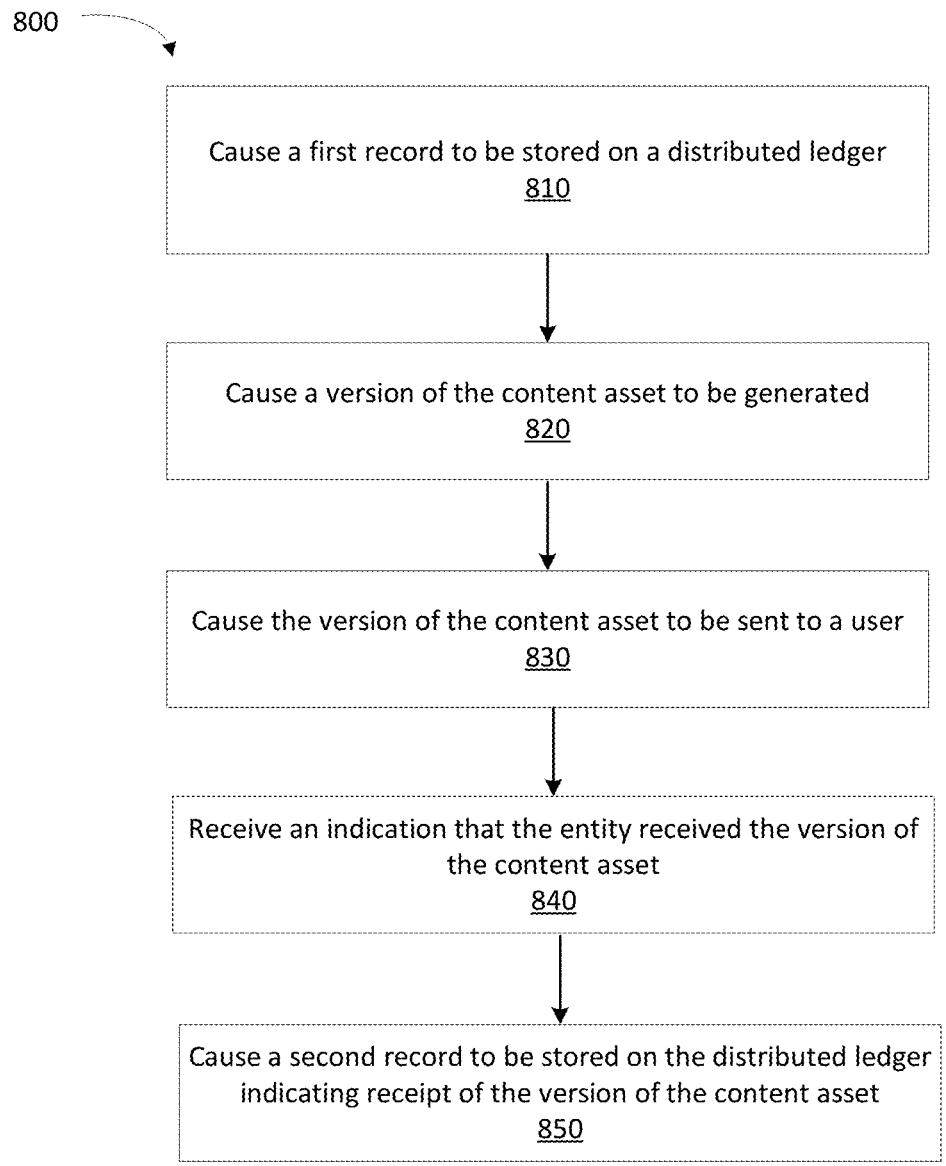
FIG. 8 shows a flow diagram of an example method.

FIG. 8 shows an example method 800. Method 800 may be performed before, during, or after method 700. Steps of method 800 may be performed in addition to or instead of steps of method 700.

At step 810, a first distributed ledger record may be stored on a distributed ledger. The distributed ledger may be associated with a content asset. The distributed ledger may be associated with a creator of the content asset. The distributed ledger may be similar to any of distributed ledgers 120 in FIG. 1, 200 in FIG. 2, or 300 in FIG. 3. The distributed ledger may be stored on one or more distributed ledger nodes. The nodes may be similar to the nodes 110 in FIG. 1. The distributed ledger may comprise a blockchain. The distributed ledger may be stored on one or more distributed ledger nodes.

The first distributed ledger record may comprise an indication of the content asset. The first distributed ledger record may comprise an indication of the creator of the content asset. The first distributed ledger record may be caused to be stored and/or created on the distributed ledger by sending an indication of the creator and/or the content asset to a distributed ledger node. The first distributed ledger record may comprise a blockchain transaction. The first distributed ledger record may comprise a blockchain block.

The first distributed ledger record may be caused to be stored and/or created on the distributed ledger by a computing device associated with the creator (e.g., content asset access manager in FIG. 4). The distributed ledger record may be caused to be stored on the distributed ledger by sending an indication of the record, the content asset, and/or the creator to another computing device, such as a node of the distributed ledger. The first distributed ledger record may be caused to be stored and/or created on the distributed ledger based on receiving an indication of the content asset and/or the creator.

At step 820, a version of the content asset may be caused to be generated, located, and/or received. The version of the content asset may be caused to be generated, located, and/or received based on the indication of the producer. The version of the content asset may be caused to be generated, located, and/or received based on receiving a request for the content asset. The version of the content asset may be caused to be generated, located, and/or received based on receiving an indication of the user.

The version of the content asset may be caused to be generated, located, and/or received by sending the indication of the creator and/or the indication of the content asset to a digital rights management (DRM) packager. The DRM packager may comprise one or more computing devices that are configured to generate a version of a digital content asset that comprises a digital marker, such as a watermark.

The version of the content asset may comprise a plurality of frames. A digital marker, such as a watermark or a digital fingerprint, may be embedded in one or more of the frames. The digital marker may comprise code embedded in a codec of the content asset, such as in a codec of the one or more frames of the content asset. The digital marker may be invisible. The digital marker may comprise an image or a pattern. The digital marker may be opaque, transparent, or semi-transparent. The digital marker may overlay at least a portion of one or more frames of the content asset.

The digital marker may comprise text, such as indication of metadata associated with the content asset. The metadata may comprise the indication of the creator. The metadata may comprise an indication of the distributed ledger. The metadata may comprise an indication of the first distributed ledger record, such as an indication of a hash of a preceding record on the distributed ledger. The digital marker may comprise an indication of a user (e.g., an entity, a creator, an originator, an editor, a processor, a distributor, a viewer). The digital marker may comprise an indication of a time that the request was received or sent.

The digital marker may be indelibly embedded in the frames of the content asset. For example, the indelibly embedded digital marker may be configured to remain embedded in the frames of the content asset if the content asset is copied, transformed (e.g., converted to analog or digital, frame size is changed, effects are added), or moved from one storage medium to another storage medium. The digital marker may be generated using technology of a third-party vendor. The technology may comprise a proprietary digital marker or watermarking technology. The version of the content asset may be generated using an original version of the content asset from the creator.

At step 830, the version of the content asset may be caused to be sent to the user. The version of the content asset may be caused to be sent to a computing device associated with the user (e.g., computing device 402 in FIG. 4). The version of the content asset may be stored at a storage location accessible to the user.

At step 840, an indication may be received that the user received the version of the content asset. The indication may be received from the user, such as from a computing device associated with the user. An indication of a time of receipt of the version of the content asset may be received.

At step 850, a second distributed ledger record may be caused to be stored and/or created on the distributed ledger. The second distributed ledger record may be caused to be stored and/or created on the distributed ledger based on the user receiving the version of the content asset. The second distributed ledger record may comprise an indication that the user received the version of the content asset. The second distributed ledger record may comprise an indication of a time that the version was sent and/or received.

The second distributed ledger record may be caused to be stored and/or created on the distributed ledger by the computing device associated with the creator. The second distributed ledger record may be caused to be stored and/or created on the distributed ledger by the computing device associated with the user. For example, step 840 may be bypassed and the computing device associated with the user may directly cause the second distributed ledger record to be stored and/or created on the distributed ledger, such as based on receiving the version of the content asset. The computing device associated with the entity may send an indication of the second distributed ledger record and/or receipt of the version of the content asset to a node of the distributed ledger.

Subsequent records may be stored and/or created on the distributed ledger indicating other entities and/or users sourcing, sending, requesting, receiving, editing, processing, accessing, and/or possessing the content asset. The subsequent records may be stored based on requests associated with the other entities. The steps of method 800 may be performed in a different order. One or more steps may be omitted. One or more steps may be repeated. Additional steps may be performed.

After steps 810-850, a version of the content asset may be determined. The version may comprise a pirated version. Pirated content may comprise a version of a content asset that was made, accessed, and/or sent without the authorization of a rights holder of the content. The version of the content asset may comprise any of the generated versions of the content asset. The version of the content asset may comprise a version of the content asset that is distributed without the authority of a rights holder of the content asset. The version of the content asset may comprise one or more frames having a digital marker. Data may be extracted from the digital marker. For example, the indication of the creator, the first user, and/or the second user from the digital marker may be extracted from the digital marker. The indication of the first distributed ledger record, the second distributed ledger record, and/or the third distributed ledger record may be extracted from the digital marker.

The distributed ledger associated with the content asset may be determined and/or accessed. The distributed ledger may be searched for one or more distributed ledger records comprising any of the data extracted from the digital marker. The distributed ledger record may be located. Based on the distributed ledger records, a chain of custody of the content asset may be traced. Based on the chain of custody of the content asset, it may be determined which entities and/or users received, sent, processed, edited, accessed, and/or had possession of the version of the content asset. Based on the chain of custody of the content asset, it may be determined where in the chain piracy occurred. It may be confirmed that the version was sent and/or received by the user based on the distributed ledger record.

Figure 9:
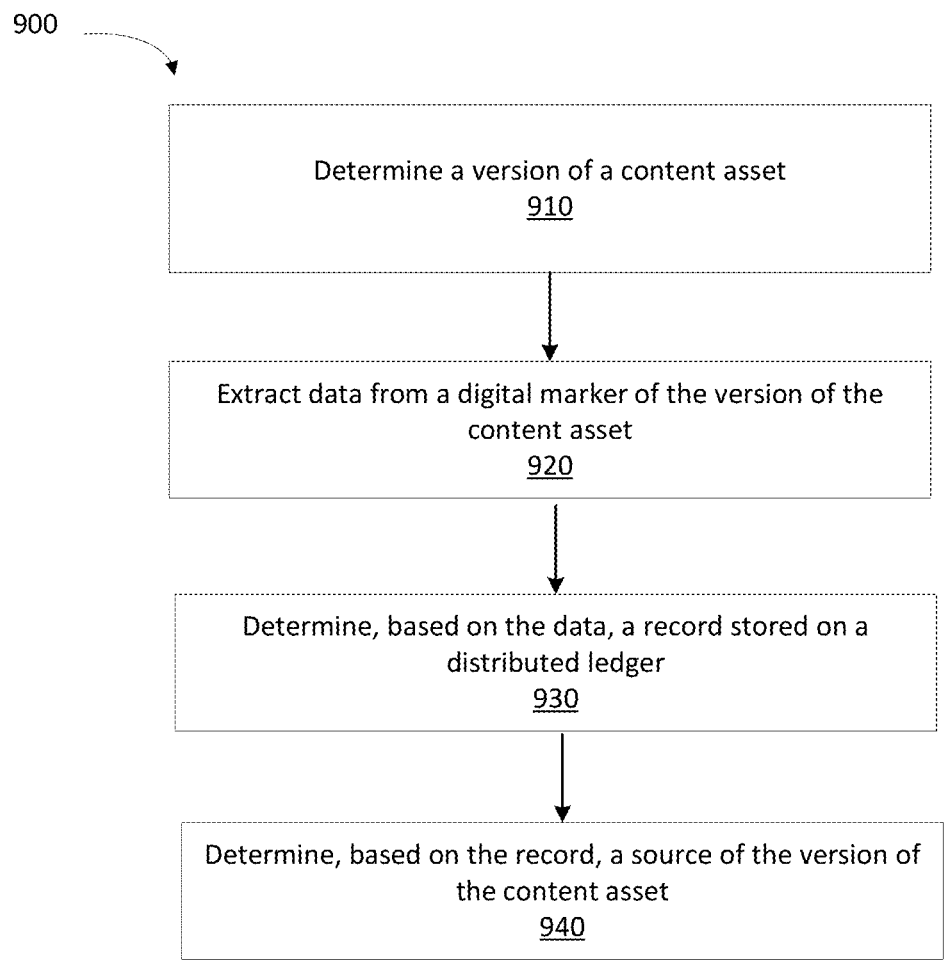
FIG. 9 shows a flow diagram of an example method.

FIG. 9 shows an example method 900. Method 900 may be performed contemporaneous with or after either of methods 700 or 800. At step 910, a version of a content asset may be determined. The version of the content asset may be determined by a computing device (e.g., monitor) associated with a forensics service provider or a piracy monitoring agency. The version of the content asset may comprise a version of the content asset that was generated, located, and/or received in any of steps 730, 760 of method 700, or step 820 of method 800, or another step. The version of the content asset may comprise a version of the content asset that is distributed without the authority of a rights holder of the content asset. The version of the content asset may comprise one or more frames having a digital marker.

At step 920, data may be extracted from a digital marker of the version of the content asset. For example, an indication of a source and/or creator of the content asset may be extracted from the digital marker. An indication of a user that received the version of the content asset (e.g., had authority to receive the version of the content asset) may be extracted from the digital marker. An indication of the distributed ledger record may be extracted from the digital marker.

At step 930, one or more records stored and/or created on a distributed ledger may be determined. The one or more records stored and/or created on a distributed ledger may be determined based on the data extracted from the digital marker. The distributed ledger may be associated with the content asset. The distributed ledger may be associated with the source and/or creator. The distributed ledger record may be determined based on any of the data extracted from the digital marker.

At step 950, a source of the version of the content asset may be determined. The source of the version of the content asset may be determined based on the one or more records. For example, the source of the version of the content asset may be determined based on a record comprising an indication of a user that requested a version of the content asset corresponding to the version of the content asset (e.g., having the digital marker). The source of the version of the content asset may further be determined based on another record comprising an indication that the user received the version of the content asset. It may be determined that the user is the source of the version of the content asset.

As an example, a file comprising data for a movie may be stored on a host server and distributed by a host site that does not have rights to distribute the movie. It may be determined that the movie was pirated in the pre-distribution, post-production stage. The version of the movie stored on the host server may comprise one or more frames having watermarks. Extraction methods may be performed on one or more of the watermarks to obtain an indication of a distributed ledger record. A distributed ledger associated with the movie may be accessed. The indicated distributed ledger record may be located. The indicated distributed ledger record may comprise an indication of a user that requested the movie. The user may be determined to be the source of the pirated movie.

Figure 10:
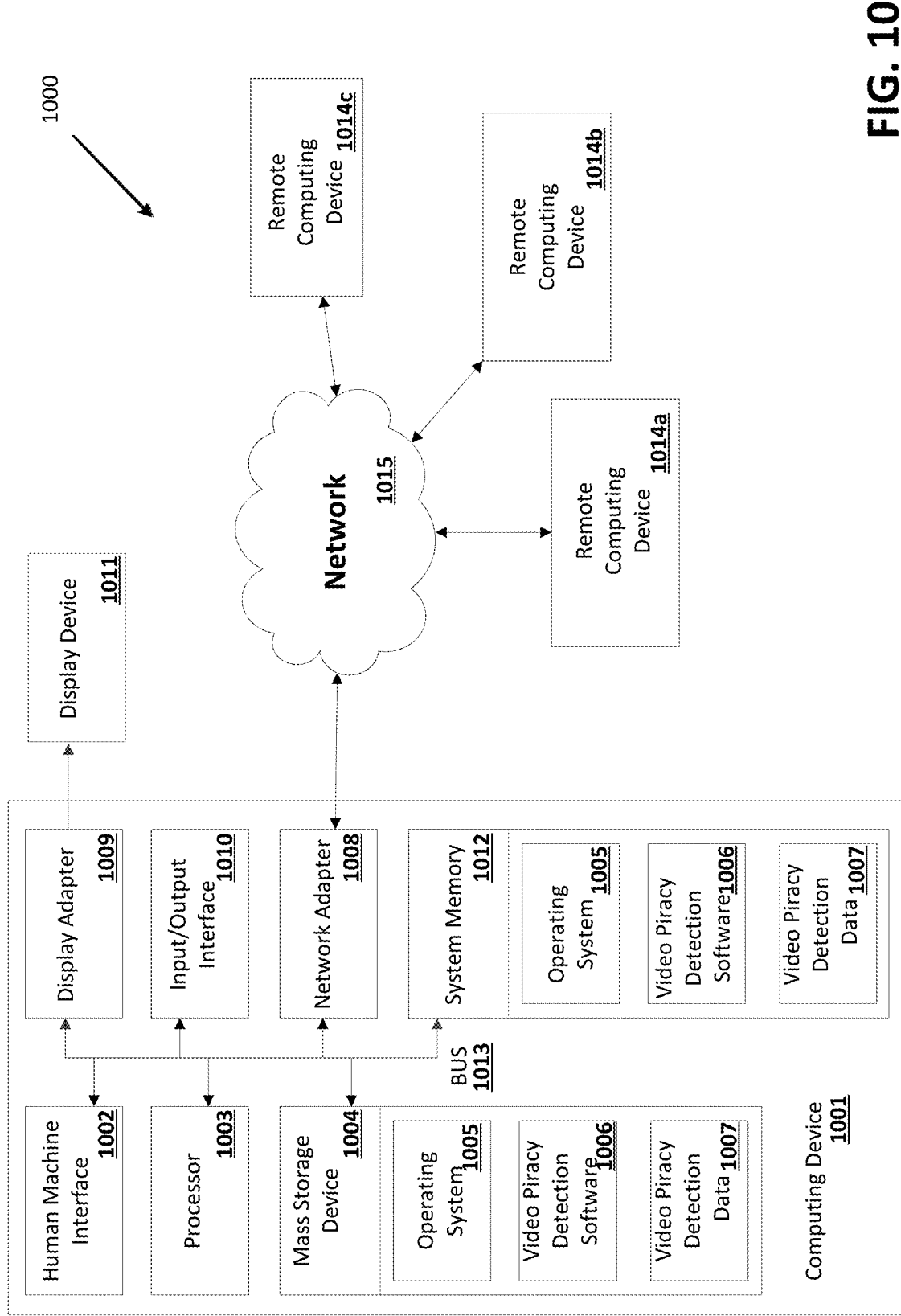
FIG. 10 shows an example computing environment.

FIG. 10 shows an example operating environment 1000. This operating environment 1000 is only an example of an operating environment and is not intended to suggest any limitation as to the scope of use or functionality of operating environment architecture. Neither should the operating environment be interpreted as having any dependency or requirement associated with any one or combination of components shown in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, and mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 1001. The components of the computing device 1001 may comprise, but are not limited to, one or more processors or processing units 1003, a system memory 1012, and a system bus 1013 that couples various system components including the processor 1003 to the system memory 1012. In the case of multiple processing units 1003, the system may utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description may be implemented over a wired or wireless network connection and each of the subsystems, including the processor 1003, a mass storage device 1004, an operating system 1005, digital content piracy deterrence software 1006, digital content piracy deterrence data 1007, a network adapter 1008, system memory 1012, an Input/Output Interface 1010, a display adapter 1009, a display device 1011, and a human machine interface 1002, may be contained within one or more remote computing devices 1014a,b,c at physically separate locations, connected through buses of this form, in effect implementing a fully distributed system.

The computing device 1001 typically comprises a variety of computer readable media. Example readable media may be any available media that is accessible by the computing device 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as digital content piracy deterrence data 1007 and/or program modules such as operating system 1005 and digital content piracy deterrence software 1006 that are immediately accessible to and/or are presently operated on by the processing unit 1003.

The computing device 1001 may comprise other removable/non-removable, volatile/non-volatile computer storage media. By way of example, FIG. 10 shows a mass storage device 1004 which may provide non-volatile storage of computer code, computer readable instructions, data structures, program modules, and other data for the computing device 1001. For example and not limitation, a mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1004, including by way of example, an operating system 1005 and digital content piracy deterrence software 1006. Each of the operating system 1005 and digital content piracy deterrence software 1006 (or some combination thereof) may comprise elements of the programming and the digital content piracy deterrence software 1006. Digital content piracy deterrence data 1007 may be stored on the mass storage device 1004. Digital content piracy deterrence data 1007 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 1001 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 1003 via a human machine interface 1002 that is coupled to the system bus 1013, but may be connected by other interface and bus structures, such as a parallel port, game port, an Institute of Electrical and Electronics Engineers (IEEE) 1094 Port (also known as a Firewire port), a serial port, or a universal serial bus (USB).

A display device 1011 may be connected to the system bus 1013 via an interface, such as a display adapter 1009. It is contemplated that the computing device 801 may have more than one display adapter 1009 and the computer 1001 may have more than one display device 1011. For example, a display device may comprise a monitor, an LCD (Liquid Crystal Display), or a projector. In addition to the display device 1011, other output peripheral devices may comprise components such as speakers (not shown) and a printer (not shown) which may be connected to the computing device 1001 via Input/Output Interface 1010. Any step and/or result of the methods may be output in any form to an output device. Such output may comprise any form of visual representation, including, but not limited to, textual, graphical, animation, audio, tactile, and the like. The display 1011 and computing device 1001 may comprise part of one device, or separate devices.

The computing device 1001 may operate in a networked environment using logical connections to one or more remote computing devices 1014a,b,c. By way of example, a remote computing device may comprise a personal computer, a portable computer, a smart phone, a server, a router, a network computer, a peer device or other common network node. Logical connections between the computing device 1001 and a remote computing device 1014a,b,c may be made via a network 1015, such as a local area network (LAN) and a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are shown herein as discrete blocks, although such programs and components may reside at various times in different storage components of the computing device 1001, and may be executed by the data processor(s) of the computer. An implementation of digital content piracy deterrence software 1006 may be stored on or sent across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
receiving, by one or more computing devices, an indication of a content asset and an indication of a first user, wherein the first user is associated with the content asset;
causing, by the one or more computing devices, a first distributed ledger record to be created on a distributed ledger, wherein the first distributed ledger record comprises the indication of the content asset and the indication of the first user;
causing, by the one or more computing devices, a first digital marker to be added to one or more frames of a first version of the content asset, wherein the first digital marker comprises the indication of the first user;
receiving, by the one or more computing devices, a request for the content asset;
causing, by the one or more computing devices, a second distributed ledger record to be created on the distributed ledger, wherein the second distributed ledger record comprises an indication of a second user associated with the request;
removing, by the one or more computing devices, the first digital marker from the one or more frames of the first version of the content asset; and
causing, by the one or more computing devices, a second version of the content asset to be generated, the generating comprising causing a second digital marker to be added to at least one of the one or more frames.

2. The method of claim 1, wherein the request for the content asset is a first request, further comprising:
receiving a second request for the content asset; and
causing a third distributed ledger record to be created on the distributed ledger, wherein the third distributed ledger record comprises an indication of a third user associated with the second request.

3. The method of claim 2, further comprising:
determining a pirated version of the content asset; and
determining, based on the pirated version of the content asset comprising the second digital marker, that the third user was a source of the pirated version of the content asset.

4. The method of claim 1, wherein at least one of the first digital marker or the second digital marker comprises an indication of the distributed ledger.

5. The method of claim 1, wherein the distributed ledger comprises one or more additional distributed ledger record entries indicating one or more additional users associated with one or more additional requests for one or more of the first version of the content asset or the second version of the content asset.

6. The method of claim 1, wherein the indication of the first user comprises a first cryptographic key associated with the first user and the indication of the second user comprises a second cryptographic key associated with the second user.

7. The method of claim 1, wherein the distributed ledger comprises a blockchain, and
wherein the first distributed ledger record comprises a genesis block of the blockchain.

8. A device comprising:
one or more processors; and
memory storing instructions that, when executed by the one or more processors, cause the device to:
receive an indication of a content asset and an indication of a first user, wherein the first user is associated with the content asset;
cause a first distributed ledger record to be created on a distributed ledger, wherein the first distributed ledger record comprises the indication of the content asset and the indication of the first user;
cause a first digital marker to be added to one or more frames of a first version of the content asset, wherein the first digital marker comprises the indication of the first user;
receive a request for the content asset;
cause a second distributed ledger record to be created on the distributed ledger, wherein the second distributed ledger record comprises an indication of a second user associated with the request;
remove the first digital marker from the one or more frames of the first version of the content asset; and
cause a second version of the content asset to be generated, the generating comprising causing a second digital marker to be added to at least one of the one or more frames.

9. The device of claim 8, wherein the request for the content asset is a first request, and wherein the instructions, when executed, cause the device to:
receive a second request for the content asset; and
cause a third distributed ledger record to be created on the distributed ledger, wherein the third distributed ledger record comprises an indication of a third user associated with the second request.

10. The device of claim 9, wherein the instructions, when executed, cause the device to:
determine a pirated version of the content asset; and
determine, based on the pirated version of the content asset comprising the second digital marker, that the third user was a source of the pirated version of the content asset.

11. The device of claim 8, wherein at least one of the first digital marker or the second digital marker comprises an indication of the distributed ledger.

12. The device of claim 8, wherein the distributed ledger comprises one or more additional distributed ledger record entries indicating one or more additional users associated with one or more additional requests for one or more of the first version of the content asset or the second version of the content asset.

13. The device of claim 8, wherein the indication of the first user comprises a first cryptographic key associated with the first user and the indication of the second user comprises a second cryptographic key associated with the second user.

14. The device of claim 8, wherein the distributed ledger comprises a blockchain, and
wherein the first distributed ledger record comprises a genesis block of the blockchain.

15. A system comprising:
at least one computing device configured to store a distributed ledger; and
one or more computing devices configured to:
receive an indication of a content asset and an indication of a first user, wherein the first user is associated with the content asset;
cause a first distributed ledger record to be created on the distributed ledger, wherein the first distributed ledger record comprises the indication of the content asset and the indication of the first user;

cause a first digital marker to be added to one or more frames of a first version of the content asset, wherein the first digital marker comprises the indication of the first user;

receive a request for the content asset;

cause a second distributed ledger record to be created on the distributed ledger, wherein the second distributed ledger record comprises an indication of a second user associated with the request;

remove the first digital marker from the one or more frames of the first version of the content asset; and cause a second version of the content asset to be generated, the generating comprising causing a second digital marker to be added to at least one of the one or more frames.

16. The system of claim 15, wherein the request for the content asset is a first request, and wherein the at least one computing device of the plurality of computing devices is further configured to:

receive a second request for the content asset; and cause a third distributed ledger record to be created on the distributed ledger, wherein the third distributed ledger record comprises an indication of a third user associated with the second request.

17. The system of claim 16, wherein the at least one computing device of the plurality of computing devices is further configured to:

determine a pirated version of the content asset; and determine, based on the pirated version of the content asset comprising the second digital marker, that the third user was a source of the pirated version of the content asset.

18. The system of claim 15, wherein at least one of the first digital marker or the second digital marker comprises an indication of the distributed ledger.

19. The system of claim 15, wherein the distributed ledger comprises one or more additional distributed ledger record entries indicating one or more additional users associated with one or more additional requests for one or more of the first version of the content asset or the second version of the content asset.

20. The system of claim 15, wherein the indication of the first user comprises a first cryptographic key associated with the first user and the indication of the second user comprises a second cryptographic key associated with the second user.

21. The system of claim 15, wherein the distributed ledger comprises a blockchain, and wherein the first distributed ledger record comprises a genesis block of the blockchain.

22. A non-transitory computer-readable medium storing instructions that, when executed, cause:

receiving, by one or more computing devices, an indication of a content asset and an indication of a first user, wherein the first user is associated with the content asset;

causing, by the one or more computing devices, a first distributed ledger record to be created on a distributed ledger, wherein the first distributed ledger record comprises the indication of the content asset and the indication of the first user;

causing, by the one or more computing devices, a first digital marker to be added to one or more frames of a first version of the content asset, wherein the first digital marker comprises the indication of the first user;

receiving, by the one or more computing devices, a request for the content asset;

causing, by the one or more computing devices, a second distributed ledger record to be created on the distributed ledger, wherein the second distributed ledger record comprises an indication of a second user associated with the request;

removing, by the one or more computing devices, the first digital marker from the one or more frames of the first version of the content asset; and causing, by the one or more computing devices, a second version of the content asset to be generated, the generating comprising causing a second digital marker to be added to at least one of the one or more frames.

23. The non-transitory computer-readable medium of claim 22, wherein the request for the content asset is a first request, and wherein the instructions, when executed, further cause:

receiving a second request for the content asset; and causing a third distributed ledger record to be created on the distributed ledger, wherein the third distributed ledger record comprises an indication of a third user associated with the second request.

24. The non-transitory computer-readable medium of claim 23, wherein the instructions, when executed, further cause:

determining a pirated version of the content asset; and determining, based on the pirated version of the content asset comprising the second digital marker, that the third user was a source of the pirated version of the content asset.

25. The non-transitory computer-readable medium of claim 22, wherein at least one of the first digital marker or the second digital marker comprises an indication of the distributed ledger.

26. The non-transitory computer-readable medium of claim 22, wherein the distributed ledger comprises one or more additional distributed ledger record entries indicating one or more additional users associated with one or more additional requests for one or more of the first version of the content asset or the second version of the content asset.

27. The non-transitory computer-readable medium of claim 22, wherein the indication of the first user comprises a first cryptographic key associated with the first user and the indication of the second user comprises a second cryptographic key associated with the second user.

28. The non-transitory computer-readable medium of claim 22, wherein the distributed ledger comprises a blockchain, and wherein the first distributed ledger record comprises a genesis block of the blockchain.

* * * * *